(12) United States Patent
Zheng et al.

(10) Patent No.: US 6,678,595 B2
(45) Date of Patent: Jan. 13, 2004

(54) SYSTEM AND METHOD OF SIMULATING A STEERING RESISTANCE TORQUE ON A VEHICLE STEERING WHEEL

(75) Inventors: Bing Zheng, Dublin, OH (US); Gregory James Stout, Ann Arbor, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 46 days.

(21) Appl. No.: 10/112,409

(22) Filed: Mar. 29, 2002

(65) Prior Publication Data

US 2003/0187558 A1 Oct. 2, 2003

(51) Int. Cl.$^7$ ............................................... A01B 69/00
(52) U.S. Cl. ....................... 701/41; 180/446; 180/443; 180/422
(58) Field of Search ............................. 701/41, 20, 42, 701/36; 180/446, 443, 422, 412, 413

(56) References Cited

U.S. PATENT DOCUMENTS

| 5,668,722 A | 9/1997 | Kaufmann et al. ........... 701/41 |
| 5,704,446 A | 1/1998 | Chandy et al. ............. 180/446 |
| 5,845,222 A | 12/1998 | Yamamoto et al. ........... 701/41 |
| 6,041,882 A | 3/2000 | Bohner et al. ............. 180/402 |
| 6,535,806 B2 * | 3/2003 | Millsap et al. ............. 701/42 |
| 6,550,565 B2 * | 4/2003 | Thomas et al. ............ 180/402 |

FOREIGN PATENT DOCUMENTS

| EP | 0 379 393 | 1/1990 |
| EP | 0 775 624 A2 | 5/1997 |
| EP | 1 125 825 A2 | 8/2001 |
| EP | 1 211 159 A1 | 11/2001 |

* cited by examiner

Primary Examiner—Marthe Y. Marc-Coleman
(74) Attorney, Agent, or Firm—Brinks Hofer Gilson & Lione

(57) ABSTRACT

The present invention involves a system and method of simulating a steering resistance torque on a vehicle steering wheel of a steer-by-wire system. The steer-by-wire system uses a magnetorheological device and a motor to apply torque on the steering wheel for simulating the steering resistance torque. The method includes sensing an actual angular velocity of the steering wheel, comparing the actual angular velocity with a threshold angular velocity, and calculating a magnetorheological torque signal based on the comparison. The method further includes determining an error signal based on the MR signal and a torque reference signal, and calculating a motor torque signal indicative of motor torque to be applied to the steering wheel. The method further includes applying torque generated by the MR device and the motor on the steering wheel.

37 Claims, 2 Drawing Sheets

SYSTEM AND METHOD OF SIMULATING A STEERING RESISTANCE TORQUE ON A VEHICLE STEERING WHEEL

FIELD OF THE INVENTION

The present invention relates to a system and method of simulating a steering resistance torque on a vehicle steering wheel of a steer-by-wire system using a magnetorheological device and a motor.

BACKGROUND OF THE INVENTION

Vehicle steer-by-wire systems are known and are ever so changing. Steer-by-wire systems eliminate the mechanical linkages between the steering wheel and the vehicle road wheels and allow for electronic steering of the vehicle by a driver thereof. Thus, in order to provide an appropriate feel to a steer-by-wire system, mechanisms are placed adjacent the steering wheel and steering shaft of the vehicle to generate resistive torque which resist a driver when the steering wheel is rotated for a vehicle turn during normal operation of the vehicle. This simulates for the driver an appropriate feel to the vehicle steering wheel as though the driver were driving a vehicle having a conventional mechanical steering wheel assembly.

Although current systems and methods of providing steering resistive torque are adequate, improvements can be made thereto. Typically, a motor is placed on the steering wheel shaft to generate torque applied on the steering wheel. This accomplishes a resistive torque on the steering wheel when the driver rotates the steering wheel during a turn. Torque generated by the motor has been identified as "active" force or torque on the steering wheel, since such torque is generated with a direction opposite the direction in which the driver rotates the steering wheel. The power required to generate such torque is relatively significant. However, manufacturers have been challenged in improving current systems and methods, specifically in areas of response time and power efficiency.

BRIEF SUMMARY OF THE INVENTION

Thus, it is one aspect of the present invention to provide a system and method of simulating a steering resistance torque on a vehicle steering wheel of a steer-by-wire system.

It is another aspect of the present invention to provide a system and method of simulating a steering resistance torque for improved response time and power efficiency. In this aspect, the present invention provides an improved steer-by-wire system which responds in less time to actual steering wheel and vehicle parameters and operates with improved power efficiency. The present invention includes a steer-by-wire system which uses a motor and a magnetorheological (MR) device for variable damping on the steering wheel.

In this aspect of the present invention, implementation of both the motor and the MR device allows the system to generate an improved torque response, saving time and energy, depending on steering wheel and vehicle parameters. As mentioned above, torque generated by the motor has been identified as "active" force or torque on the steering wheel, since such torque can be generated in either rotational direction of the steering wheel. Generally, "active" torque is applied in a direction opposite the direction in which the driver rotates the steering wheel. However, torque generated by the MR device has been labeled as "passive" force or torque on the steering wheel, since such torque is generated with constant resistance that may react only in the opposite direction in which the steering wheel is rotated. Based on vehicle and steering wheel parameters, the system may determine whether active torque, passive torque, or a combination thereof will be applied on the steering wheel. The extent to which passive force is used instead of active force improves the power efficiency of the steering system because the magnetorheological device produces more torque than the motor, given the same amount of electrical energy.

Further aspects, features and advantages of the invention will become apparent from consideration of the following description and the appended claims when taken in connection with the accompanying drawings.

DETAILED DESCRIPTION OF THE INVENTION

Figure 1:
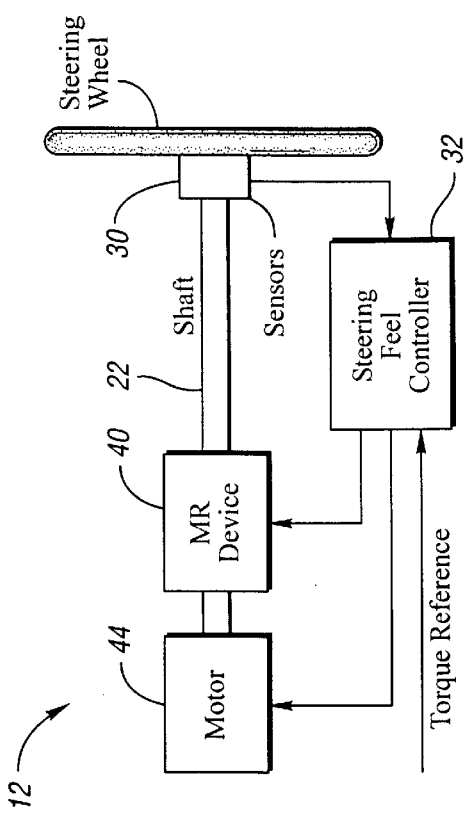
FIG. 1 is a schematic diagram of a steer-by-wire system of a vehicle steering wheel assembly having a magnetorheological device and a motor for simulating a steering resistance torque on a steering wheel.

FIG. 1 illustrates a steer-by-wire system 12 of a vehicle in which the steer-by-wire system 12 simulates a steering resistance torque on a steering wheel assembly including a steering wheel 20 and a steering shaft 22. Steer-by-wire system 12 includes a control logic to simulate a steering resistance torque on steering wheel 20 so that a driver of the vehicle experiences a steering feel during operation of the vehicle. As shown, sensor 30 is attached to steering wheel 20 to receive a driver input, such as actual angular velocity, on the steering wheel. Steering feel controller 32 is in electrical communication with sensor 30 and configured to receive an angular velocity signal therefrom to be processed for determining an amount of torque applied to the steering wheel.

Steer-by-wire system 12 further includes magnetorheological (MR) device 40 and motor 44. As shown, MR device 40 is attached to steering shaft 22 and is in electrical communication with steering feel controller 32. MR device 40 having an MR control is configured to receive an MR torque signal from steering feel controller 32, wherein the MR torque signal is indicative of torque to be applied by the MR device on the steering wheel 20 for simulating a resistance torque during normal operation of the vehicle. The MR torque is generated by the MR device and applied on the steering wheel.

Motor 44 is also attached to steering shaft 22 and is in electrical communication with steering feel controller 32. Motor 44 having a motor control is configured to receive a motor torque signal from steering feel controller 32, wherein the motor torque signal is indicative of torque to be applied by the motor on the steering wheel for simulating a steering resistance torque during normal operation of the vehicle. The motor torque is generated by the motor and applied on the steering wheel.

The steering wheel sensor is configured to measure rotational displacement of the steering wheel assembly. Any type of suitable sensor may be used to sense rotational displacement of the steering wheel assembly. This may include potentiometers, optical sensors, encoder sensors, resolver sensors, and any other suitable sensor.

The MR device is a torque producing device having magnetorheological low viscosity fluid which may be oil having ferrous particles suspended therein. As known, when current is applied across the magnetorheological fluid, a magnetic flux occurs and the ferrous particles align consistent with the magnetic flux. As a result, the relatively low viscosity fluid becomes a relatively high viscosity fluid, creating hydraulic friction on the steering wheel as the steering wheel is rotated. The MR device may be a magnetorheological damping device manufactured by Lord using Rheonetice magnetorheological fluid technology. Such MR device may have the specifications of a torque rating of 500 rpm, a breakaway torque of 10 Newton-meters (Nm), a braking response time of 10 milliseconds (ms), a current of 1 Amp, an electrical impedance of 1 ohm and a power consumption of 12 watts.

The motor used in this embodiment of the present invention may be any suitable motor capable of receiving the motor torque signal ranging between 0–5 amps and capable of producing motor torque ranging between 0.1–5.0 Newton-meters. In this embodiment, a motor amplifier may be used.

The motor amplifier is an electronic circuit which receives the motor torque signal from the controller and produces as output an electric signal whose voltage and current power the motor to produce the desired level of torque. The motor amplifier used may be any type of motor amplifier capable of receiving the motor torque signal ranging between about 0–5 amps and outputs torque ranging between 0.1–5.0 Newton-meters. In this embodiment, an MR amplifier (not shown) may be used to convert a digital signal to an electric signal to power the MR device. An MR amplifier may be used to receive the MR torque signal from the controller to convert the signal to an electrical signal whose voltage and current power the MR device to produce the desired level of torque on the steering wheel.

Figure 2:
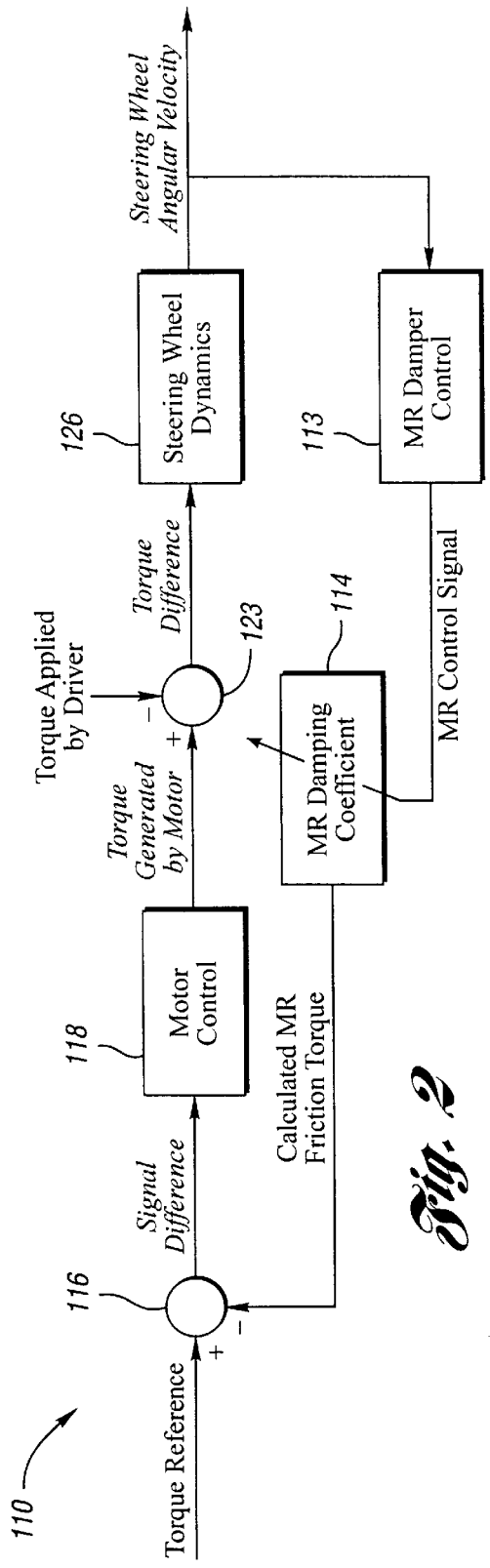
FIG. 2 is a schematic diagram of a control logic used in the steer-by-wire system of FIG. 1 for simulating a steering resistance torque on the steering wheel.

FIG. 2 depicts a control logic diagram 110 outlining signal flow of steer-by-wire system 12. In box 113, the MR damper control receives an actual angular velocity signal indicative of the actual angular velocity of the steering wheel to determine a coefficient $K_{MR}$ for MR damping. In box 114, when determined, coefficient $K_{MR}$ is multiplied by the actual angular velocity v to determine an MR torque represented by an MR torque signal $u_{MR}$. This may be represented as follows:

$$u_{MR} = K_{MR} V.$$

The MR device generates MR torque $\tau_{MR}$ and applies the MR torque to the steering wheel. Then, a torque error signal $e_{MR}$ is determined between the MR torque signal $u_{MR}$ and a torque reference signal $u_{REF}$ in box 116. The torque reference signal is a function of a steering wheel variable. The steering wheel variable may include current vehicle speed, angular velocity of the steering wheel, and steering wheel angle. In this embodiment, the torque error signal $e_{MR}$ is a difference between the MR control signal and the torque reference signal. In determining the torque error signal $e_{MR}$, a summer in box 116 receives the MR torque signal and determines a difference between the MR torque signal $u_{MR}$ and the torque reference signal $u_{REF}$. This may be represented as follows:

$$e_{MR} = u_{MR} - u_{REF}.$$

Then, the error signal is sent to the motor control.

In box 118, the MR difference signal $e_{MR}$ is processed and multiplied by a coefficient $K_d$ for the motor control to determine a motor torque signal $u_M$ which is indicative of an amount of torque to be generated by the motor on the steering wheel. This may be represented by an equation as follows:

$$u_M = e_{MR} K_d.$$

In box 123, the motor generates motor torque $\tau_M$ according to the motor torque signal $u_M$. Then, a torque difference $\tau_{diff}$ is determined between the motor torque $\tau_M$ and a disturbance torque $\tau_R$ indicative of an amount of torque applied by a driver on the steering wheel. The steering wheel dynamics of the vehicle experiences the torque difference $\tau_{diff}$ resulting in an actual angular velocity of the steering wheel which may be again sensed by the sensor. This may be represented as follows:

$$\tau_R = \tau_M - \tau_{diff}.$$

Figure 3:
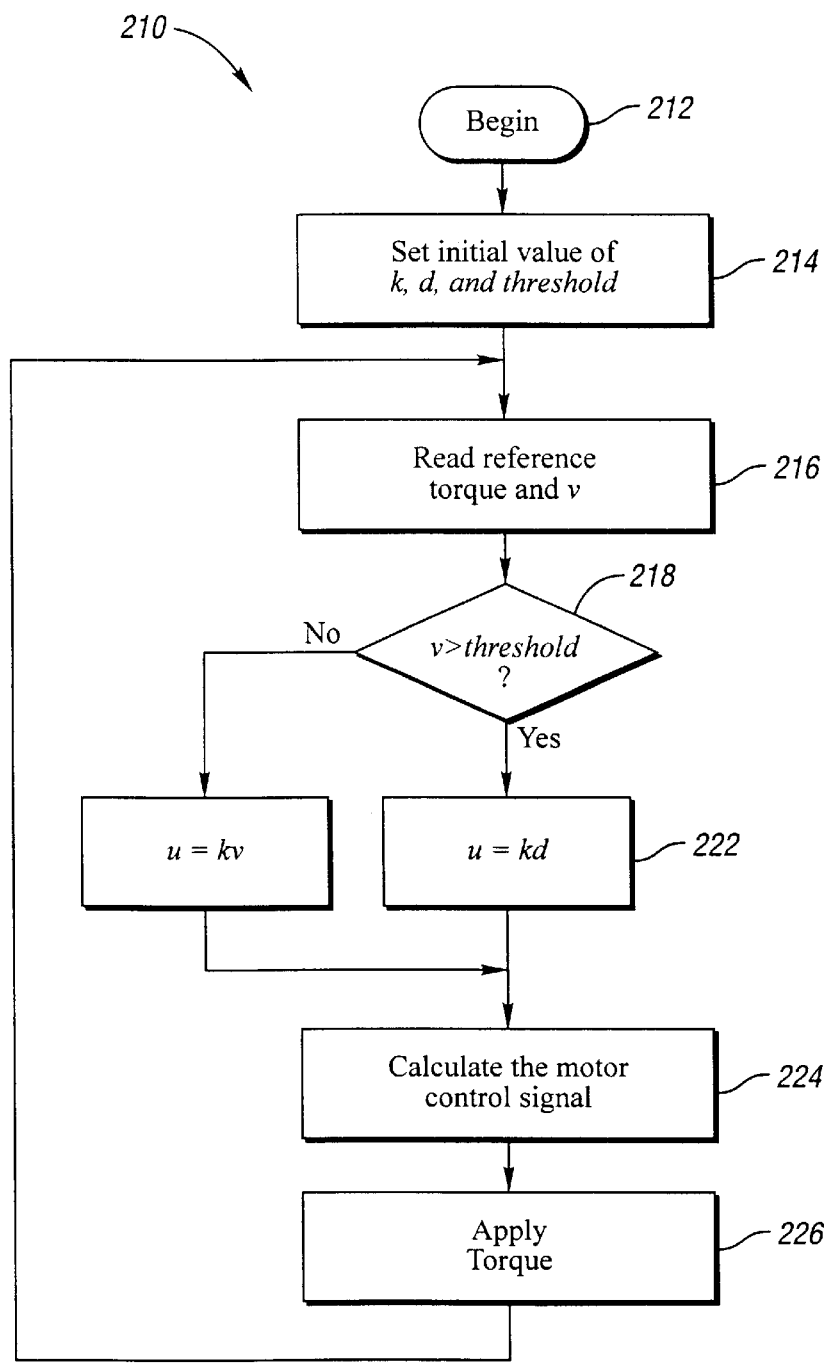
FIG. 3 is one method of the control logic in FIG. 2 in accordance with the present invention.

FIG. 3 illustrates one method 210 of simulating a steering resistance torque on a steering wheel of steer-by-wire system 12 using an MR device and a motor. Method 210 is implemented by steer-by-wire system 12 in control logic diagram 110. Method 210 includes beginning the steering control by sensing an engine startup of the vehicle in box 212. This may be accomplished with various sensors known in the art for sensing an engine startup or merely sensing a key in the ignition keyhole. As shown in box 214, method 210 includes setting the coefficients $K_{MR}$, $K_M$ and other reference values, e.g., reference torque value.

In box 216, the method includes sensing an actual angular velocity of the steering wheel and reading the reference values. For example, the angular velocity sensor, which may be attached to the steering wheel, may receive a driver input during operation of the vehicle. As the driver rotates the steering wheel, the sensor senses the angular velocity of the turn and sends an actual angular velocity signal indicative of the actual angular velocity of the steering wheel. The actual angular velocity signal may be sent to the steering feel controller for further processing. The sensor may also read the torque reference and determine a torque reference signal to be used as described below.

Method 210 further includes receiving the actual velocity signal indicative of the actual angular velocity of the steering wheel inputted by the driver.

In box 218, method 210 includes comparing the actual angular velocity with a threshold angular velocity of the steering wheel. The threshold angular velocity may range between 5°–10° per second.

It is to be noted that a software program may be configured in the steering feel controller to perform the steps of method 210. However, steps of method 210 may be performed in separate units within the steer-by-wire system.

The method 210 further includes calculating an MR torque signal indicative of MR torque to be applied by the MR device on the steering wheel. The MR torque signal is based on the comparison in box 218 of the actual angular velocity with the threshold angular velocity of the steering wheel. In box 220, the step of calculating the MR torque signal is accomplished by determining the MR torque based on a friction coefficient $K_{MR}$ and the actual angular velocity, if the actual angular velocity is less than the threshold angular velocity. When the actual angular velocity is determined to be less than the threshold angular velocity, the friction coefficient $K_{MR}$ is multiplied by the actual angular velocity to compute the MR torque signal indicative of the MR torque to be applied by the MR device on the steering wheel. This may be represented as follows:

$$u_{MR}=K_{MR}V.$$

The friction coefficient $K_{MR}$ is indicative of a slope of a magnetorheological performance curve (discussed in greater detail below) compensated to simulate hydraulic viscosity friction on the steering wheel. In this embodiment, the performance curve is based on the actual angular velocity of the steering wheel and the vehicle speed.

In box 222, the step of calculating the MR torque signal further includes determining the MR torque based on a maximum torque signal d, if the actual angular velocity is not less than the threshold angular velocity. When the actual angular velocity is determined to be not less than the threshold angular velocity, the maximum torque signal d is used to produce the MR torque signal indicative of the MR torque to be applied by the MR device on the steering wheel. This may be represented as follows:

$$u_{MR}=d.$$

The MR device then applies the MR torque on the steering wheel.

It is to be noted that when the actual angular velocity is determined to be zero, no MR torque is generated by the MR device.

Figure 4:
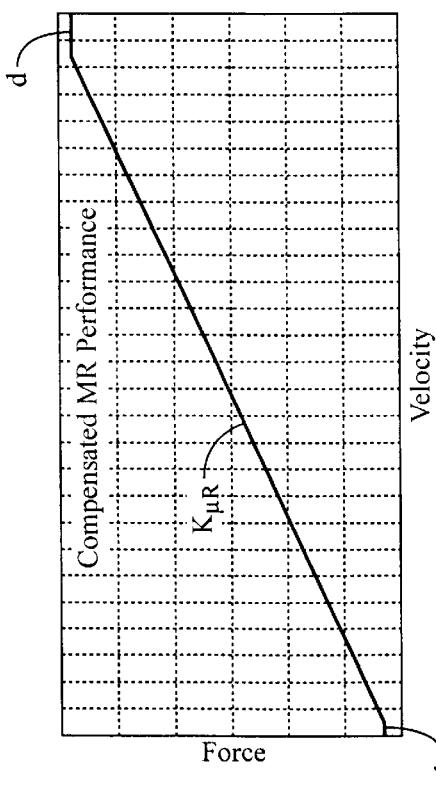
FIG. 4 is a graph depicting a magnetorheological performance curve for simulating hydraulic viscosity friction on a steering wheel.

FIG. 4 depicts a curve $K_{MR}$ representing a magnetorheological performance curve compensated to simulate hydraulic viscosity friction on a steering wheel. In this embodiment, the curve is based on force (torque) and velocity (angular velocity of the steering wheel). Coefficient $K_{MR}$ represents the slope of the curve and maximum torque d represents substantially horizontal portions of the curve. The steering feel controller then sends to the MR device MR control signal $u_{MR}$ indicative of the MR torque to be generated.

In box 224, a motor torque signal $u_M$ is calculated based on the error signal $e_{MR}$ as mentioned above. As described above, the error signal $e_{MR}$ is determined by calculating the difference between the MR signal $u_{MR}$ and a torque reference signal $u_{REF}$ as mentioned above. The motor torque signal $u_M$ is indicative of motor torque by the motor applied on the steering wheel. In this embodiment, the motor torque signal $u_M$ is calculated by multiplying the error signal $e_{MR}$ with a coefficient $K_d$ of the motor to produce the motor torque signal $u_M$. This may be represented as follows:

$$u_M=e_{MR}K_d.$$

The motor torque signal is converted to a corresponding amount of motor torque to be generated by the motor. Torque is then applied on the steering wheel by the MR device and the motor in box 226.

The MR torque ranges between about 0–5 Newton-meters. The MR torque signal ranges between about 0–1 amps. The motor torque ranges between about 0–5 Newton-meters. The motor torque signal ranges between about 0–5 amps.

In use, the present invention provides an improved steer-by-wire system by implementing a motor and an MR device. The use of both a motor and an MR device for generating resistive torque on the steering wheel allows both active torque, passive torque, and combinations thereof to be applied on the steering wheel. This provides an improved power efficiency, resulting in a more competitive steer-by-wire system.

While the present invention has been described in terms of preferred embodiments, it will be understood, of course, that the invention is not limited thereto since modifications may be made to those skilled in the art, particularly in light of the foregoing teachings.

What is claimed:

1. A method of simulating a steering resistance torque on a vehicle steering wheel of a steer-by-wire system using a magnetorheological device and a motor, the method comprising:
    sensing an actual angular velocity of the steering wheel;
    comparing the actual angular velocity with a threshold angular velocity of the steering wheel;
    calculating a magnetorheological torque signal indicative of magnetorheological torque to be applied by the magnetorheological device on the steering wheel, the magnetorheological torque signal being based on the comparison of the actual angular velocity with a threshold angular velocity of the steering wheel;
    determining an error signal based on the magnetorheological signal and a torque reference signal, the torque reference signal being a function of a steering wheel variable;
    calculating a motor torque signal indicative of motor torque to be applied by the motor to the steering wheel, the motor torque signal being based on the error signal and an input torque signal, the error signal being a difference between the magnetorheological torque signal and the torque reference signal;
    applying the magnetorheological torque generated by the magnetorheological device to the steering wheel; and
    applying the motor torque generated by the motor to the steering wheel.

2. The method of claim 1 wherein the threshold angular velocity is about 5–10 degrees per second.

3. The method of claim 1 wherein the input torque signal is indicative of input torque from the driver on the vehicle steering wheel.

4. The method of claim 1 wherein the steering wheel variable includes vehicle speed, angular velocity of the steering wheel, and steering wheel angle.

5. The method of claim 1 further comprising:
    receiving an actual angular velocity signal indicative of the actual angular velocity of the steering wheel;
    sending the magnetorheological control signal indicative of the magnetorheological torque to be generated; and
    sending the motor control signal indicative of the motor torque to be generated.

6. The method of claim 5 wherein the step of determining the error signal includes:
    receiving the magnetorheological torque signal;
    determining a difference between the magnetorheological torque signal and the torque reference signal; and
    sending the error signal indicative of the difference.

7. The method of claim 5 wherein the magnetorheological torque signal about 0–1 amps.

8. The method of claim 5 wherein the motor torque signal about 0–5 amps.

9. The method of claim 1 wherein the step of calculating the magnetorheological torque signal includes:
    determining the magnetorheological torque based on a friction coefficient and the actual angular velocity, if the actual angular velocity is less than the threshold angular velocity; and
    determining the magnetorheological torque based on a maximum torque, if the actual angular velocity is not less than the threshold angular velocity.

10. The method of claim 9 wherein the friction coefficient is indicative of a slope of a magnetorheological performance curve compensated to simulate hydraulic viscosity friction on the steering wheel, the performance curve based on the actual angular velocity of the steering wheel and vehicle speed.

11. The method of claim 1 wherein the magnetorheological torque is from about 0–5 Newton-meters.

12. The method of claim 1 wherein the motor torque is from 0–5 about Newton-meters.

13. A method of simulating steering feel on a vehicle steering wheel of a steer-by-wire system using a magnetorheological device and a torque motor, the method comprising:
    providing a threshold angular velocity of the steering wheel, an input torque indicative of external torque on the steering wheel, and a torque reference based on a steering wheel variable;
    receiving an actual angular velocity signal indicative of an actual angular velocity of the steering wheel;
    sending a magnetorheological control signal based on a comparison of the actual angular velocity with the threshold angular velocity, the magnetorheological torque signal being indicative of a magnetorheological torque to be generated by the magnetorheological device;
    sending a motor control signal based on a error difference and the input torque, the error difference being a difference between the magnetorheological torque and the torque reference, the motor control signal being indicative of a motor torque to be generated by the motor;
    generating the magnetorheological torque with the magnetorheological device on the steering wheel; and
    generating the motor torque with the motor on the steering wheel.

14. The method of claim 13 wherein the threshold angular velocity is about 5–10 degrees per second.

15. The method of claim 13 wherein the external torque represents input torque from the driver on the vehicle steering wheel.

16. The method of claim 13 wherein the steering wheel variable includes vehicle speed, angular velocity of the steering wheel, and steering wheel angle.

17. The method of claim 13 further comprising:
    sensing the actual angular velocity of the steering wheel;
    calculating the magnetorheological torque based on a comparison of the actual angular velocity with the threshold angular velocity; and
    calculating the motor torque based on error difference and the input torque, the reference error difference being a difference between the magnetorheological torque and the torque reference.

18. The method of claim 17 wherein the step of calculating the motor torque includes:
    receiving the magnetorheological control signal for determining the reference error difference;
    determining the reference error difference between the magnetorheological torque and the torque reference; and
    sending a difference signal indicative of the reference error difference.

19. The method of claim 18 wherein the step of calculating the magnetorheological torque includes:
    comparing the actual angular velocity with the threshold angular velocity, defining the comparison of the actual angular velocity with the threshold angular velocity;
    determining the magnetorheological torque based on a friction coefficient and the angular velocity, if the actual angular velocity is less than the threshold angular velocity; and
    determining the magnetorheological torque based on a maximum torque, if the actual angular velocity is not less than the threshold angular velocity.

20. The method of claim 19 wherein the friction coefficient is indicative of a slope of a magnetorheological performance curve compensated to simulate hydraulic viscosity friction on the steering wheel.

21. The method of claim 13 wherein the magnetorheological torque is from about 0–5 Newton-meters.

22. The method of claim 13 wherein the motor torque is from 0–5 about Newton-meters.

23. The method of claim 13 wherein the magnetorheological torque signal is about 0–1 amps.

24. The method of claim 13 wherein the motor torque signal is about 0–5 amps.

25. A system for simulating steering feel on a vehicle steering wheel, the system comprising:
    a sensor atttached to the steering wheel for sensing an actual angular velocity signal indicative of an actual angular velocity of the steering wheel;
    a controller in electrical communication with the sensor for sending a magnetorheological torque signal based on a comparison of the actual angular velocity with a threshold angular velocity, the magnetorheological torque signal being indicative of a magnetorheological torque to be generated and for sending a motor control signal based on a error difference and an input torque indicative of external torque on the steering wheel, the error difference being a difference between the magnetorheological torque and a torque reference based on a steering wheel variable, the motor control signal being indicative of a motor torque to be generated;
    a magnetorheological device in electrical communication with the controller for generating the magnetorheological torque on the steering wheel; and
    a motor in electrical communication with the controller for generating the motor torque on the steering wheel.

26. A method of simulating a hydraulic viscosity friction on a vehicle steering wheel of a steer-by-wire system using a magnetorheological device and a torque motor, the method comprising:
    providing a threshold angular velocity of the steering wheel, an input torque indicative of external torque on the steering wheel, and a torque reference based on a steering wheel variable;
    sensing an actual angular velocity of the steering wheel;
    calculating a magnetorheological torque based on comparison of the actual angular velocity with a threshold angular velocity;
    calculating a motor torque based on the reference error difference and the input torque;
    applying the magnetorheological torque on the steering wheel generated by the magnetorheological device, if the actual angular velocity is not equal to zero; and
    the motor torque on the steering wheel generated by the torque motor.

27. The method of claim 26 wherein the threshold angular velocity is about 5–10 degrees per second.

28. The method of claim 26 wherein the external torque represents input torque from the driver on the vehicle steering wheel.

29. The method of claim 26 wherein the steering wheel variable includes vehicle speed, angular velocity of the steering wheel, and steering wheel angle.

30. The method of claim 26 further comprising:

receiving an actual angular velocity signal indicative of the actual angular velocity of the steering wheel;

sending a magnetorheological control signal indicative of the magnetorheological torque to be generated; and sending a motor control signal indicative of the motor torque to be generated.

31. The method of claim 30 wherein the step of calculating the motor torque includes:

receiving the magnetorheological control signal for determining the reference error difference;

determining the error difference between the magnetorheological torque and the torque reference; and sending a difference signal indicative of the reference error difference.

32. The method of claim 30 wherein the magnetorheological torque signal about 0–1 amps.

33. The method of claim 30 wherein the motor torque signal is about 0–5 amps.

34. The method of claim 26 wherein the step of calculating the magnetorheological torque includes:

comparing the actual angular velocity with the threshold angular velocity, defining the comparison of the actual angular velocity with the threshold angular velocity;

determining the magnetorheological torque based on a friction coefficient and the angular velocity, if the actual angular velocity is less than the threshold angular velocity; and determining the magnetorheological torque based on a maximum torque, if the actual angular velocity is not less than the threshold angular velocity.

35. The method of claim 34 wherein the friction coefficient is indicative of a slope of a magnetorheological performance curve compensated to simulate hydraulic viscosity friction on the steering wheel.

36. The method of claim 26 wherein the magnetorheological torque is from about 0–5 Newton-meters.

37. The method of claim 26 wherein the motor torque is from 0–5 about Newton-meters.

* * * * *